United States Patent [19]
Schroeder et al.

[11] Patent Number: 5,841,131
[45] Date of Patent: Nov. 24, 1998

[54] FIBER OPTIC PRESSURE TRANSDUCERS AND PRESSURE SENSING SYSTEM INCORPORATING SAME

[75] Inventors: Robert J. Schroeder, Newtown, Conn.; Eric Udd, Troutdale, Oreg.

[73] Assignee: Schlumberger Technology Corporation, Ridgefield, Conn.

[21] Appl. No.: 888,566

[22] Filed: Jul. 7, 1997

[51] Int. Cl.$^6$ ...................................................... H01J 5/16
[52] U.S. Cl. .............................. 250/227.17; 250/227.14; 250/231.1; 385/37
[58] Field of Search ........................ 250/227.17, 227.14, 250/227.18, 231.1; 385/37; 340/555–557

[56] References Cited

U.S. PATENT DOCUMENTS

| | | | |
|---|---|---|---|
| 4,659,923 | 4/1987 | Hicks, Jr. ................................. | 250/227 |
| 5,380,995 | 1/1995 | Udd et al. ........................... | 250/277.18 |
| 5,515,459 | 5/1996 | Farhadiroushan ......................... | 385/12 |
| 5,591,965 | 1/1997 | Udd .................................. | 250/227.18 |
| 5,627,921 | 5/1997 | Lidgard et al. ..................... | 250/227.14 |

OTHER PUBLICATIONS

Article by Xu et al. entitled "Fiber Grating Pressure Sensor with Enhanced Sensitivity Using a Glass–Bubble Housing", Electronics Letters, 18th Jan. 1995, vol. 32, No. 2, pp. 128–129.

Article by Jansen et al., entitled "High Pressure Fiber–optic Sensor with Side–Hole Fiber", SPIE vol. 798 Fiber Optic Snensors II, Jan. 1987, pp. 56–60.

Article by Xu, entitled "Optical In–Fibre Grating High Pressure Sensor", Electronics Letters, 18th Feb. 1993, vol. 29, No. 4, pp. 398–399.

Article by Morey entitled "Distributed Fiber Grating Sensors", Published Dec. 1990; pp. 285–288.

*Primary Examiner*—Que Le
*Attorney, Agent, or Firm*—David P. Gordon; Keith G.W. Smith

[57] ABSTRACT

A fiber optic pressure transducer having enhanced resolution and dynamic range includes a fiber optic core having one or more gratings written onto it, a birefringence structure for enhancing the birefringence of the core, and a structure for converting isotropic pressure forces to anisotropic forces on the fiber core. Several different embodiments of prestressing structure are disclosed (both extrinsic and intrinsic). Several different embodiments of structure (both extrinsic and intrinsic) for converting isotropic pressure to anisotropic pressure are also disclosed. The fiber optic pressure transducer according to the invention is advantageously used in conjunction with a light source and a spectral demodulation system in order to detect pressure ambient to the fiber optic pressure transducer based on the wavelength and shift of spectral peaks.

27 Claims, 12 Drawing Sheets

FIBER OPTIC PRESSURE TRANSDUCERS AND PRESSURE SENSING SYSTEM INCORPORATING SAME

BACKGROUND OF THE INVENTION

1. Field of the Invention

The invention relates to fiber optic pressure sensors. More particularly, the invention relates to fiber optic pressure sensors having enhanced resolution and dynamic range.

2. State of the Art

Fiber optic sensor technology has developed concurrently with fiber optic telecommunication technology. The physical aspects of optical fibers which enable them to act as wave guides for light are affected by environmental influences such as temperature, pressure, and strain. These aspects of optical fibers which may be considered a disadvantage to the telecommunications industry are an important advantage to the fiber optic sensor industry.

Optical fibers, whether used in telecommunications or as environmental sensors, generally include a cylindrical core, a concentric cylindrical cladding surrounding the core, and a concentric cylindrical protective jacket surrounding the cladding. The core is made of transparent glass or plastic having a certain index of refraction. The cladding is also made of transparent glass or plastic, but having a different, smaller, index of refraction. The ability of the optical fiber to act as a bendable waveguide is largely determined by the relative refractive indices of the core and the cladding.

The refractive index of a transparent medium is the ratio of the velocity of light in a vacuum to the velocity of light in the medium. As a beam of light enters a medium, the change in velocity causes the beam to change direction. More specifically, as a beam of light travels from one medium into another medium, the beam changes direction at the interface of the two media. In addition to changing direction at the interface of two media, a portion of the incident beam is reflected at the interface such that the energy of the beam travelling through the second medium is diminished (the sum of the energy of the refracted and reflected beams must equal the energy of the incident beam). The angles of reflection and refraction can be predicted using Snell's law if the refractive indices of both media are known.

By altering the indices of refraction of two adjacent media, the angle of refraction and the angle of reflection of a beam travelling toward the interface of the two media can be altered such that the intensity of the light entering the second medium approaches zero and substantially all of the light is reflected at the interface. Conversely, for any two transparent media, there is a critical angle of incidence at their interface at or below which substantially all of the incident light will be reflected. This phenomenon, known as total internal reflection, is applied in choosing the refractive indices of the core and the cladding in optical fibers so that light may propagate through the core of the fiber with minimal power loss.

Many other factors affect the propagation of light through the fiber optic core, including the dimensions of the core and the cladding, the wavelength of the light, the magnetic field vectors of the light and electrical field vectors of the light. In addition, many of the physical laws used to determine the ideal propagation of light through a wave guide (optical fiber) assume an "ideal" wave guide, i.e. a straight wave guide with perfect symmetry and no imperfections. For example, the diameter of the core will determine whether the fiber optic is "single mode" or "multimode". The terms single mode and multimode refer to the dimensional orientation of rays propagating through the fiber. Single mode fibers have a core with a relatively small diameter (2–12 microns) and support only one mode of propagation, axial. Multimode fibers have a core with a relatively large diameter (25–75 microns) and permit non-axial rays or modes to propagate through the core. The so-called single mode fibers are actually two mode fibers in the sense that there are two different states of optical polarization that can be propagated through the core. In an ideal, straight, imperfection-free fiber with perfect circular symmetry, the propagation velocity of light is independent of the direction of polarization.

A fiber with an elliptical core will have two preferred directions of polarization (along the major axis and along the minor axis). Linearly polarized light injected into the fiber at any other direction of polarization will propagate in two separate modes that travel at slightly different velocities. This type of fiber is said to have a "modal birefringence". In a real fiber of this type, even ideally polarized light will couple into the other mode due to imperfections in the core-cladding interface, index of refraction fluctuations, and other mechanisms. Static and dynamic changes in polarization may occur along the entire length of the fiber. Over a given distance, the phases of the two modes will pass through an entire cycle of being in phase and out of phase. This distance is known as the "beat length". A long beat length is associated with a small birefringence and a short beat length is associated with a large birefringence. Birefringent optical fibers are also known as "polarization preserving fibers" or "polarization maintaining (PM) fibers". Birefringence is achieved by providing a core with an elliptical cross section or by providing circular core with a cladding which induces stress on the core. For example, the cladding may be provided with two parallel stress members having longitudinal axes which lie in the same plane as the axis of the core.

As mentioned above, fiber optic sensors employ the fact that environmental effects can alter the amplitude, phase, frequency, spectral content, or polarization of light propagated through an optical fiber. The primary advantages of fiber optic sensors include their ability to be light weight, very small, passive, energy efficient, rugged, and immune to electromagnetic interference. In addition, fiber optic sensors have the potential for very high sensitivity, large dynamic range, and wide bandwidth. Further, a certain class of fiber sensors may be distributed or multiplexed along a length of fiber. They may also be embedded into materials.

State of the art fiber optic sensors can be classified as either "extrinsic" or "intrinsic". Extrinsic sensors rely on some other device being coupled to the fiber optic in order to translate environmental effects into changes in the properties of the light in the fiber optic. Intrinsic sensors rely only on the properties of the optical fiber in order to measure ambient environmental effects. Known fiber optic sensors include linear position sensors, rotational position sensors, fluid level sensors, temperature sensors, strain gauges, fiber optic gyroscopes, and pressure sensors.

One type of fiber optic pressure sensor takes advantage of the fact that ambient pressure places a strain on the jacket of an optical fiber which strains the cladding, thereby straining the core and changing the birefringence of the fiber. U.S. Pat. No. 4,659,923 to Hicks, Jr. discloses a fiber optics interferometer transducer which is capable of measuring pressure. The device generally includes a single mode fiber optic, a light source, a first polarizer, a second polarizer, and a light intensity detector. The first polarizer is used to polarize the light source to an angle which is 45° to the two modes of the fiber optic, whereafter the light is injected into one end of the fiber. The second polarizer is arranged at the other end of the fiber and polarizes light exiting the fiber to the same angle as the first polarizer before it is detected by the intensity detector. When a force is applied radially to the fiber, the birefringence of the fiber changes, which changes the beat length and thus the intensity of the polarized light viewed by the intensity detector. In an alternative embodiment, a beam splitter is placed between the light source and the first polarizer, and the second polarizer is replaced by a mirror coupled to the second end of the fiber optic. According to the alternative embodiment, the detector and the source may be located at the same end of the fiber optic. No data is provided regarding the sensitivity (resolution) or dynamic range of the proposed sensors. However, it is suggested that the effects of pressure on birefringence may be too small to measure at relatively low pressures. Various structures are disclosed for mounting the fiber such that isotropic forces are converted to anisotropic forces to produce birefringence and to magnify the effect. One of the structures used for this purpose is suggested by the '923 patent and disclosed in greater detail by Jansen and Dabkiewicz in an article entitled "High Pressure Fiber Optic Sensor with Side Hole Fiber", published in SPIE Proceedings, Fiber Optic Sensors II, Vol. 798, pp. 56–60, 1987. Side hole fiber is a fiber optic having a cladding which contains two parallel holes which run the length of the fiber and are parallel to the core. The axes of the holes and the core lie in a common plane. This geometry results in converting external hydrostatic pressure into anisotropic stress at the core thereby inducing birefringence. Jansen and Dabkiewicz demonstrate a sensor having an accuracy of ±0.5% in the pressure range of 100–1,000 bars (10–100 MPa, 1,450–14,500 psi) and an upper limit of 2,000 bars without fiber failure. Below 100 bars, however, birefringence tends to become undetectable or non-existent.

One of the problems with birefringent fiber optic pressure sensors is that temperature also affects the birefringence of the core. Thus, in certain applications where both temperature and pressure are variable, measures must be taken to compensate for the effects of temperature on birefringence. U.S. Pat. No. 5,515,459 to Farhadiroushan discloses a pressure sensor which includes two side hole fibers which are fused together end-to-end such that the longitudinal axis of each is rotated 90° relative to the other, i.e. the side holes and core of one fiber lie in a plane which is perpendicular to the plane in which side holes and core of the other fiber lie. The side holes in one of the fibers are sealed and the side holes in the other fiber are left open. The sealing of one of the fiber's side holes causes the core inside that fiber to sense a different pressure than the pressure sensed by the core inside the fiber with the open side holes. The combined phase delay of light through the two joined fibers cancels out the effect of temperature on the inherent birefringence of the two fibers as taught by Dakin and Wade in an article entitled "Compensated Polarimetric Sensor Using Polarization Maintaining Fiber in a Differential Configuration", published in Electron. Lett., Vol. 20, No. 1, pp. 51–53 (1984). Farhadiroushan does not disclose any data regarding the sensitivity or dynamic range of the proposed optical fiber pressure sensor.

Another type of fiber optic sensor utilizes intra-core fiber gratings as disclosed in U.S. Pat. No. 5,380,995 to Udd et al., the complete disclosure of which is incorporated by reference herein. Intra-core Bragg gratings are formed in a fiber optic by doping an optical fiber with material such as germania and then exposing the side of the fiber to an interference pattern to produce sinusoidal variations in the refractive index of the core. Two presently known methods of providing the interference pattern are by holographic imaging and by phase mask grating. Holographic imaging utilizes two short wavelength (usually 240 nm) laser beams which are imaged through the side of a fiber core to form the interference pattern. The bright fringes of the interference pattern cause the index of refraction of the core to be "modulated" resulting in the formation of a fiber grating. Similar results are obtained using short pulses of laser light, writing fiber gratings line by line through the use of phase masks. By adjusting the fringe spacing of the interference pattern, the periodic index of refraction can be varied as desired. The actual process by which the index of refraction is changed is not well understood but it is process dependent resulting in different classes of fibers which can operate at temperature ranges up to 500°–800° C. before the grating fades.

The environmental effects of temperature and strain cause the fiber to elongate or contract which changes the period of the grating and thus changes the spectral content of light transmitted or reflected by the fiber grating. In particular, for a temperature change of $\Delta T$ and a strain of $\epsilon$, the fractional Bragg wavelength shift is given by Equation 1, below, where $\alpha$ is the thermal expansion coefficient of the fiber, $\xi$ represents the thermal optic coefficient or (dn/dT) of the doped silica core material, and $P_e$ is the photo elastic constant.

$$\frac{\Delta \lambda_g}{\lambda_g} = (\alpha + \xi)\Delta T + (1 - P_e)\epsilon \tag{1}$$

For temperature, the index change is the predominant effect, being about fifteen times greater than the expansion coefficient. As reported by W. W. Morey, Distributed Fiber grating Sensors, Proceedings of the Seventh Optical Fiber Sensors Conference, pp. 285–288, Sydney, Australia, December 1990, temperature responses of fiber gratings vary with fiber type, but the responses have been found to be linear up to 500° C. Typical temperature responses are 0.0043 nm/° C. at 833 nm for Andrew PM fiber and 0.0074 nm/° C. for Corning FlexCore Fiber at 824 nm. When the fiber grating is strained, the Bragg wavelength changes to photoelastically induce a change in the refractive index. For silica, the photoelastic constant is 0.22. Bragg wavelength changes under tension have been measured to 45 kpsi stress, giving a 2.3 nm shift for a slope of $5.2 \times 10^{-4}$ nm per microstrain at 820 nm. Morey also describes how the light reflected from multiple gratings distributed along the length of a fiber optic can be multiplexed to provide many spatially separated sensors in a single optical chain.

U.S. Pat. No. 5,380,995 to Udd et al. teaches the use of a remote grating which is located to sense an environmental effect such as strain or temperature and a local grating which is located to be unaffected by the environmental effect. The spectral envelopes of both gratings are compared and the effects of strain and temperature on the remote grating can thereby be separated. The '995 patent also teaches the use of two overlaid fiber gratings of different wavelengths such as 1.3 and 1.5 microns to measure two environmental effects such as strain and temperature at a single point.

Still another way to separate the effects of strain and temperature is disclosed in U.S. Pat. No. 5,591,965 to Udd, the complete disclosure of which is fully incorporated by reference herein. The '965 patent teaches the use of a pair of gratings written in substantially the same location in a birefringent fiber. When a birefringent fiber is provided with a grating, two spectral peaks are produced (one for each polarization axis) and temperature and longitudinal strain changes affect the peak to peak separation as well as the wavelength shift of the peaks. As taught in the '965 patent, a birefringent fiber provided with two spectrally separated gratings produces four spectral outputs (peaks). Spectral detectors such as Fabry-Perot etalons coupled to the fiber detect the four spectral outputs. The spectral outputs are analyzed and four equations are solved to determine both the temperature and the strain effects on the fiber.

While neither '995 nor the '965 patent specifically refers to pressure sensors, it has been demonstrated that ultrahigh hydrostatic pressure induces fractional changes in the physical length of a fiber optic and thus induces a fractional change in the Bragg wavelength of a grating incorporated in the fiber core. For example, M. G. Xu et al., Optical In-Fibre Grating High Pressure Sensor, Electron. Lett., Vol. 29, No. 4, pp. 398–399 (1993), demonstrates how a fiber optic Bragg grating sensor can be used to measure very high pressure. In particular, Xu et al. demonstrates a simple in-fiber grating sensor which exhibits a linear Bragg wavelength shift of $3.04 \times 10^{-3}$ mm/MPa. The dynamic range and sensitivity of the sensor are not directly disclosed by Xu et al. The authors do specifically state that far more compensation for the effects of temperature is necessary for their sensor to be valuable and that the real advantage of their sensor is only evident at ultrahigh pressure.

From the above discussion, those skilled in the art will glean that the sensitivity and dynamic range of fiber optic sensors are subject to many parameters.

SUMMARY OF THE INVENTION

It is therefore an object of the invention to provide a fiber optic pressure transducer and a pressure sensing system.

It is also an object of the invention to provide a fiber optic pressure transducer which has a high resolution and a broad dynamic range when used in a pressure sensing system.

It is another object of the invention to provide a fiber optic pressure transducer which incorporates a grating fiber optic.

It is still another object of the invention to provide a fiber optic pressure transducer which incorporates a fiber optic grating having a high resolution and a broad dynamic range.

It is another object of the invention to provide a fiber optic pressure transducer having inherent temperature compensation capability.

Yet another object of the invention is to provide a fiber optic transducer which has an enhanced response to transverse strain.

Still another object of the invention is to provide a fiber optic pressure transducer which is rugged and inexpensive.

In accord with these objects which will be discussed in detail below, the fiber optic pressure transducer of the present invention includes a fiber optic core having one or more gratings written onto it, a structure for enhancing the birefringence of the core, and a structure for converting isotropic pressure forces into anisotropic forces on the fiber core. The fiber optic pressure transducer according to the invention is advantageously used in conjunction with a light source (such as an LED, a laser, or a laser diode) and a spectral demodulation system in order to detect pressure ambient to the fiber optic pressure transducer.

According to a first embodiment of the invention, the core is provided with a first elliptical cladding which acts as a structure for enhancing birefringence and a second circular cladding is placed over the first cladding. The second cladding is provided with a pair of longitudinal holes which provide the structure for converting isotropic pressure forces into anisotropic forces on the fiber core. The holes are arranged such that their longitudinal axes lie in the same plane as the longitudinal axis of the core. The elliptical cladding may be arranged with its either it major axis or minor axis lying in the same plane as the axes of the holes and the core.

According to a second embodiment, the core is provided with a circular cladding which includes a pair longitudinal holes as well as a pair of birefringence inducing rods. The holes are arranged such that their longitudinal axes lie in a first plane which also includes the longitudinal axis of the core. The rods are arranged such that their longitudinal axes lie in a second plane which also includes the longitudinal axis of the core. The holes and the rods are preferably arranged such that the second plane and the first plane intersect each other at a right angle.

According to a third embodiment, the longitudinal holes in the cladding are formed with either a V-shape or a C-shape cross section.

According to a fourth embodiment, a PM (polarization maintaining) fiber is provided with asymmetrical side holes.

According to a fifth embodiment, a conventional birefringent grating fiber optic is placed inside a capillary tube having a pair of sealed longitudinal holes.

According to a sixth embodiment, an oversized cladding is provided on a single mode fiber. The cladding is provided with oversized air holes and stress members. The air holes are sealed and the fiber is spliced to a normal sized single mode fiber.

According to a seventh embodiment, an asymmetrical side hole fiber with an elliptical core cladding is embedded in a stiff backing material with a portion of its surface exposed and a pressure diaphragm is mounted on the exposed surface.

According to an eighth embodiment, a single mode fiber with side holes is embedded in a stiff backing material with a portion of its surface exposed and a pressure diaphragm is mounted on the exposed surface. The stiff backing material is stressed with a mechanical assembly which induces birefringence in the fiber core.

According to a ninth embodiment, a side hole fiber is rolled into soft (low melting temperature) glass leaving a portion of its surface exposed.

According to a tenth embodiment, a side hole fiber is mounted between a base and a lever arm. The lever arm acts as a pressure amplifier inducing birefringence in the fiber core.

According to an eleventh embodiment, a side hole fiber is placed in a cylindrical glass tube which is then flattened to an elliptical cross section which strains the core and induces birefringence.

According to a twelfth embodiment, a pair of capped capillary tubes are bonded to the sides of a single mode or PM fiber.

According to a thirteenth embodiment, portions of a PM fiber cladding are milled or etched away and replaced with pressure sensitive material.

The fiber optic pressure transducer according to the invention may by spliced to a fiber optic lead so that the pressure transducer may be located distant from the other parts of the sensing system. In addition, several pressure transducers according to the invention may by interposed and spliced with fiber optic lead so that multiple pressure sensing locations can be multiplexed in a single fiber optic wave guide.

The pressure transducer according to the invention may by utilized in seismic and acoustic applications for single or multipoint pressure sensing or in other applications where a broad dynamic range and high resolution of pressure sensing is desirable.

Those skilled in the art will also appreciate that the invention will improve a grating response to magnetic or electric fields for multipoint sensing when suitable coatings are applied to the sensor.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
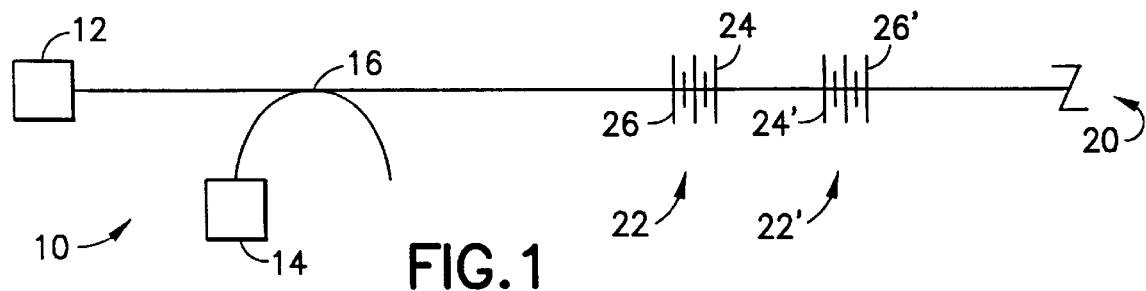
FIG. 1 is a schematic view of a fiber optic pressure sensing system according to the invention.

Referring now to FIG. 1, an exemplary fiber optic pressure sensing system 10 according to the invention generally includes a light source 12, a spectral analyzer 14, a fiber beam splitter 16, a low back reflection terminator 20, and one or more birefringent fiber optic pressure transducers 22 (22', etc.) each having one or more gratings 24, 26 (24', 26', etc.). The light source 12 may be, e.g. an LED, a tunable laser, or a laser diode. It is advantageous to use a relatively broad spectrum source which will permit the application of multiple gratings of different wavelength. The spectral analyzer 14 may be a Fabry-Perot etalon or another type of known device. The back reflection terminator may be of the type disclosed in U.S. Pat. No. 4,834,493 to Udd et al. The number of transducers and the number of gratings in each transducer is not critical so long at there is at least one transducer with one grating.

According to the invention, the fiber optic pressure transducer 22 is also provided with novel structure which produces enhanced sensitivity and dynamic range as described in more detail below with reference to the remainder of the Figures. The components of the sensing system 10 are arranged substantially as shown in FIG. 1. The light source 12 directs a beam through the beam splitter 16 such that light enters one end of the fiber optic pressure transducer 22. A spectral portion of the light is reflected back by the grating(s) 24(26) to the beam splitter 16 which directs the reflected beam onto the spectral analyzer 14. Depending on the number of different gratings 24 (26) provided on the fiber, the spectral analyzer will detect one or more pairs of spectral peaks. The wavelength of the peaks and their shift relative to each other will change based on the pressure applied to the fiber optic pressure transducer 22.

Figure 2:
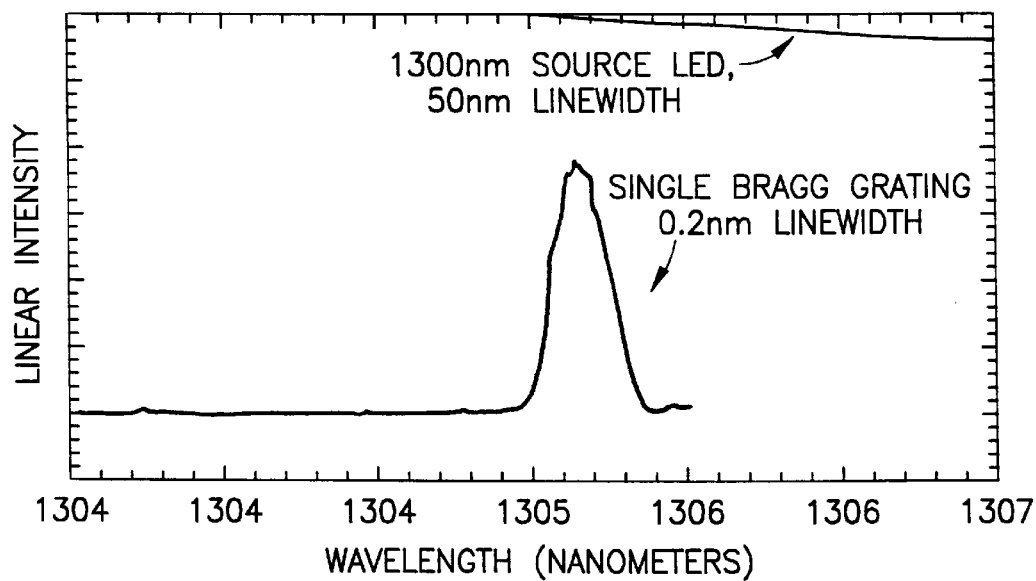
FIG. 2 is a plot of the spectral content of light reflected from a single Bragg grating in a non-PM fiber optic.
Figure 3:
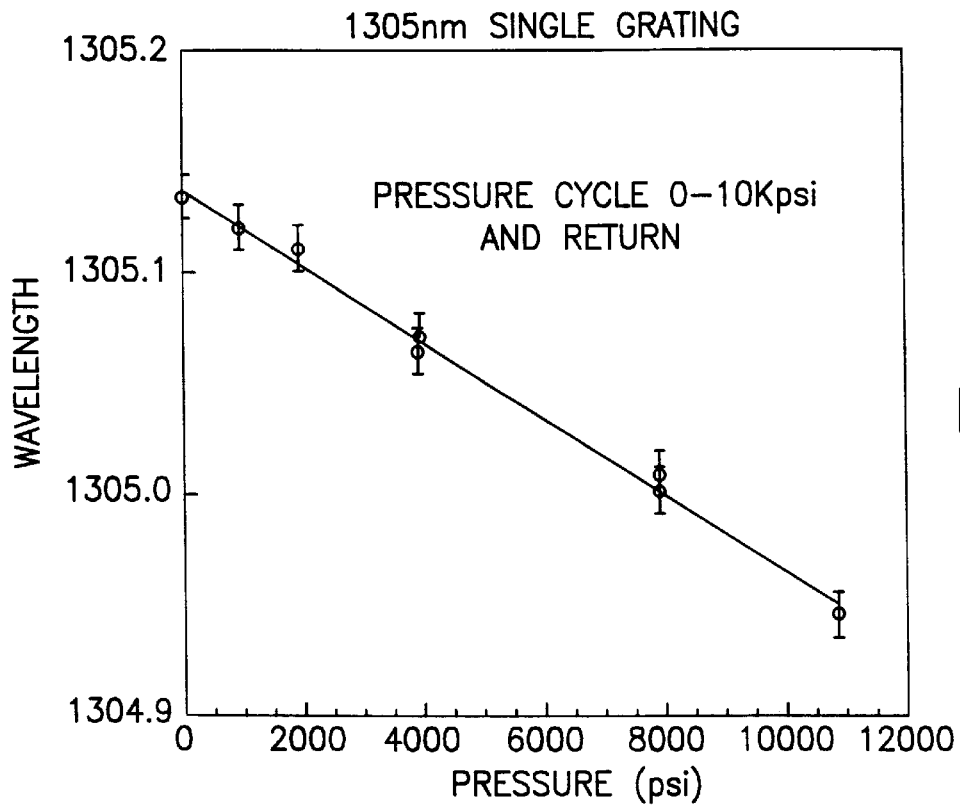
FIG. 3 is a plot of the effects of hydrostatic pressure on the wavelength of reflected from a single Bragg grating.
Figure 4:
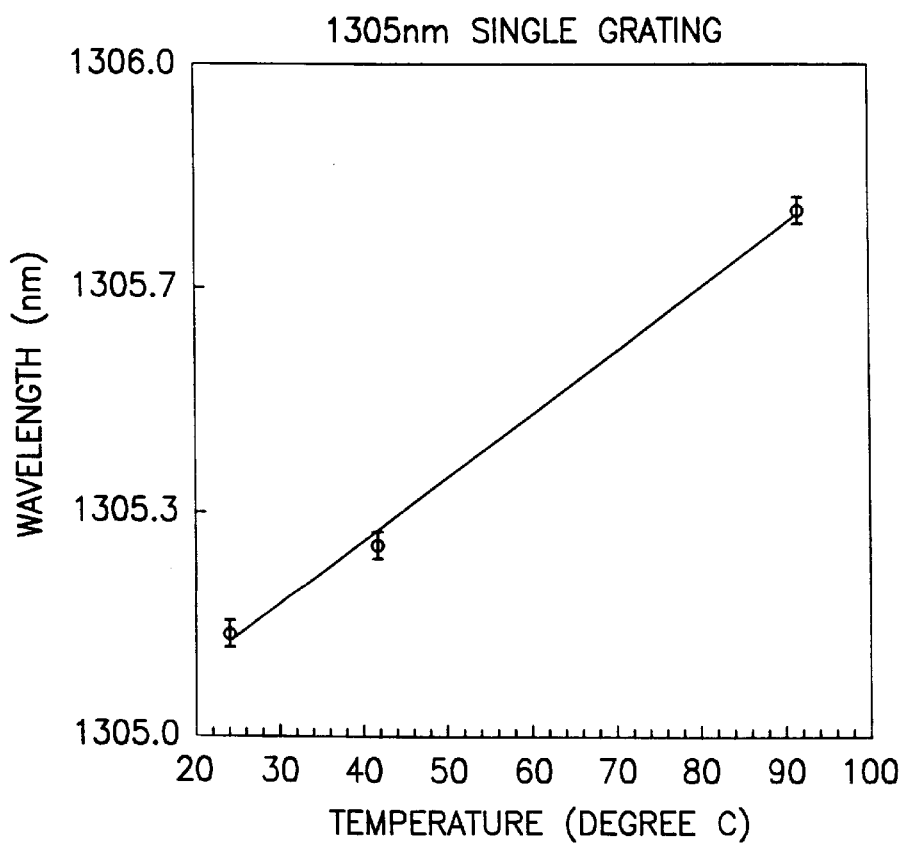
FIG. 4 is a plot of the effects of temperature on the wavelength of reflected from a single Bragg grating.

The present invention is based in part on the results of experiments performed by the inventors on the spectral shifts observed in conventional grating fibers subjected to hydrostatic pressure. A typical grating used in the experiments had a FWHM linewidth of 0.2 nm and about 50% peak reflectivity. FIG. 2 shows the reflection spectrum of such a grating when illuminated by a broadband 1.3 micron light source. It was expected that the wavelength peak would shift linearly in response to changes in temperature and strain up to 500° C. and 45 kpsi according to the Equation 1, given above. FIGS. 3 and 4 illustrate how the peak wavelength of the light reflected by the Bragg grating changes in response to changes in pressure and temperature.

Figure 5:
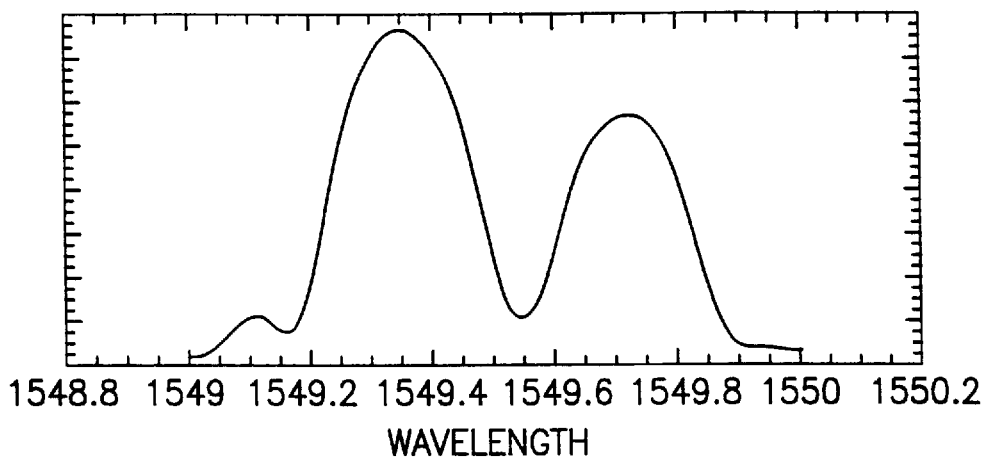
FIG. 5 is a plot of the spectral content of light reflected from a single Bragg grating in a birefringent fiber optic.

The next experiment involved a grating written onto a PM fiber in the 1.55 micron wavelength region. As expected, the birefringence of the PM fiber caused the grating to reflect light back along two orthogonal axes of different refractive indices such that two distinct peaks appeared in the spectrum of the reflected light. FIG. 5 illustrates the spectral content of light reflected from a single Bragg grating in a PM fiber.

Figure 6:
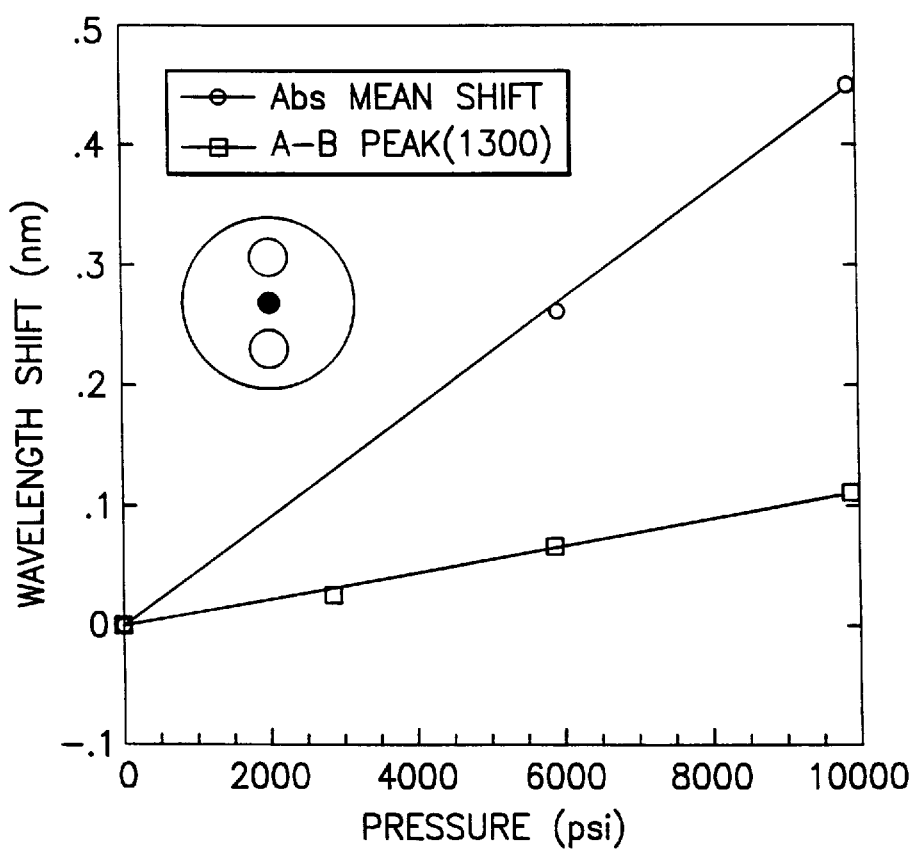
FIG. 6 is a plot of the changes in mean wavelength and peak to peak separation of the spectral content of light reflected from a single Bragg grating in a side hole fiber optic.
Figure 7A:
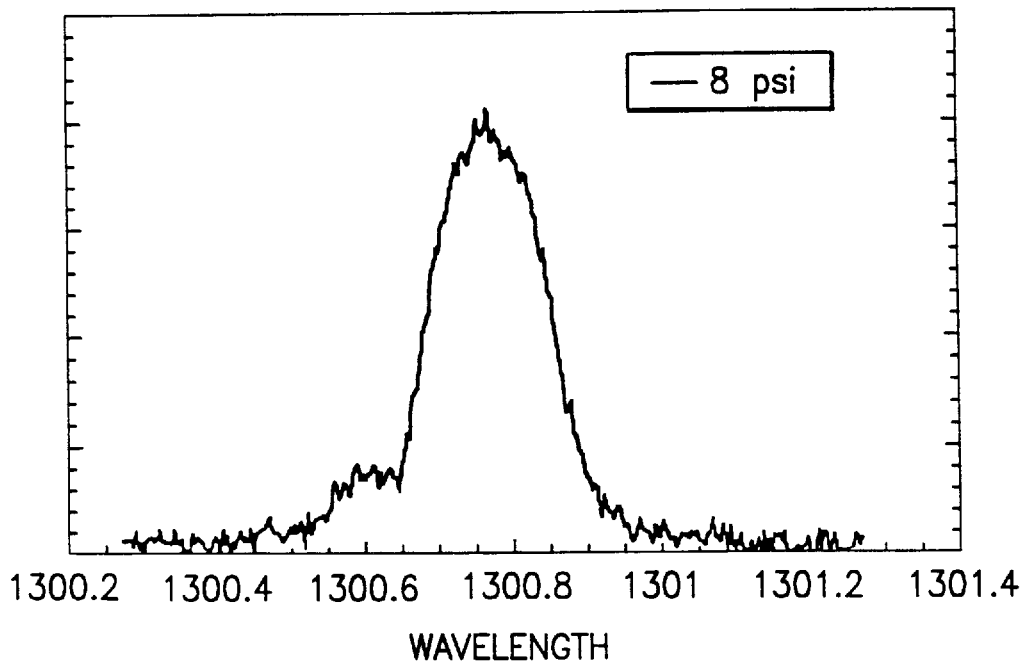
FIGS. 7a–7d are plots of the spectral content of light reflected from a single Bragg grating in a side hole fiber optic at different hydrostatic pressures.
Figure 7B:
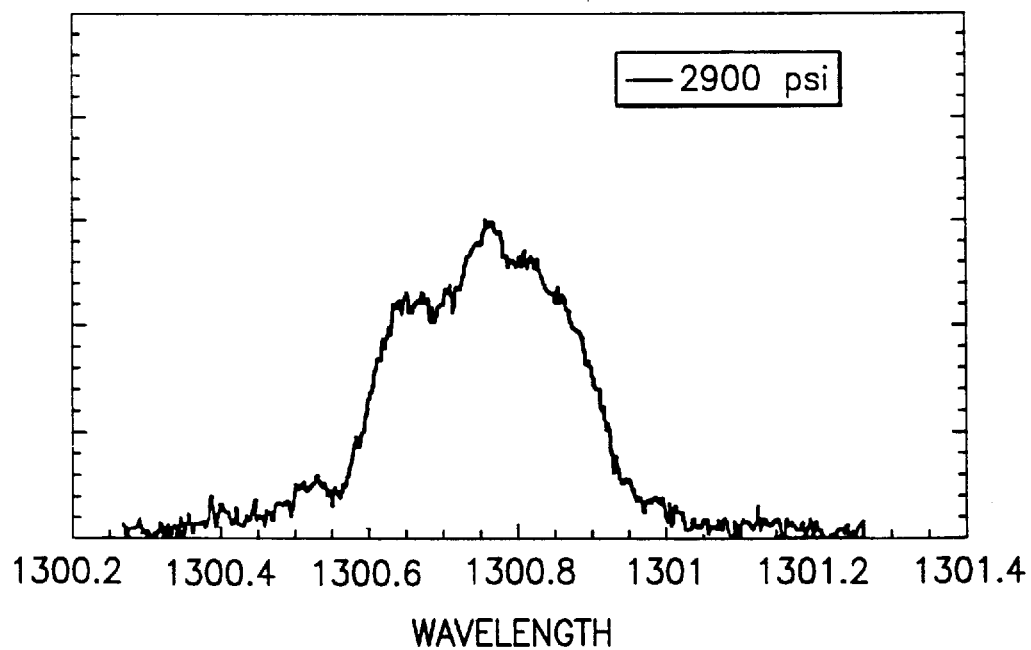
Figure 7C:
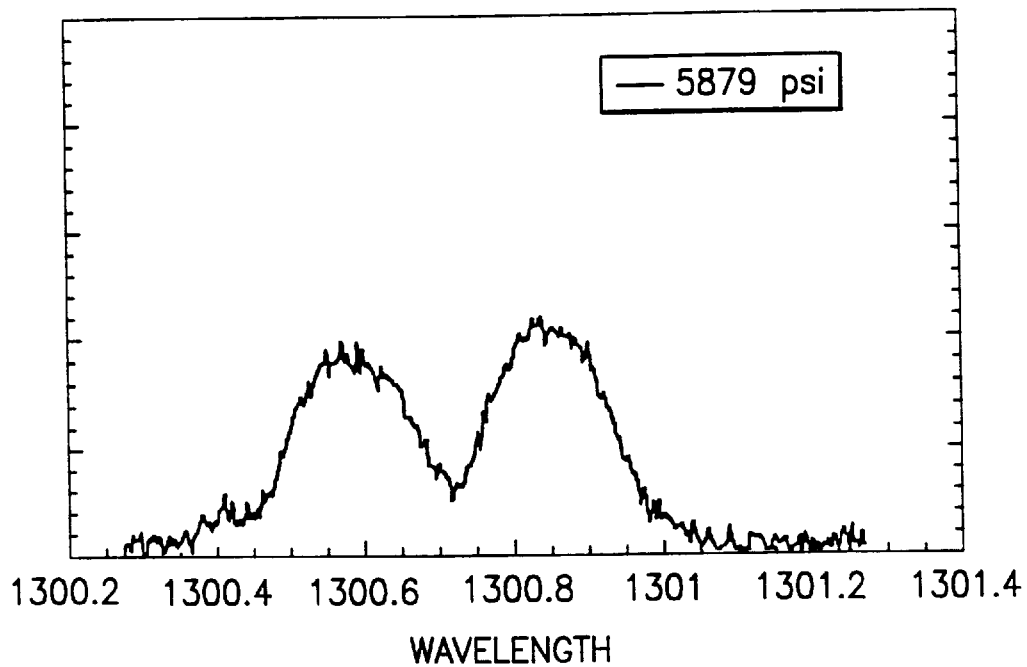
Figure 7D:
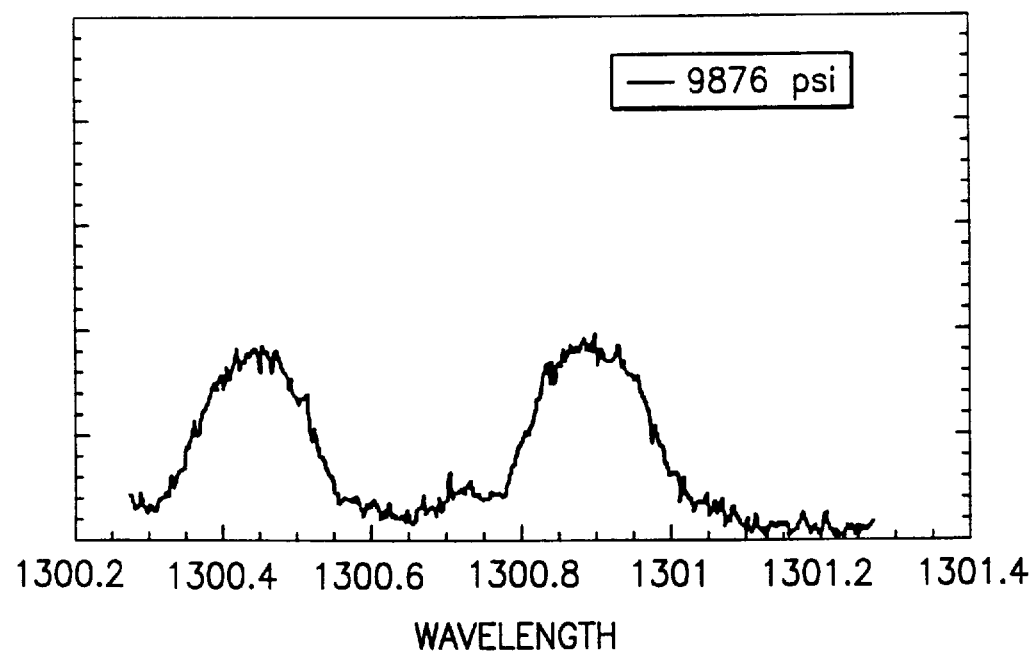

In further experiments on three different types of PM fiber, it was discovered that in a single grating PM fiber, the influence of hydrostatic pressure caused the distance between spectral peaks to increase and the mean wavelength of the peaks to shift to a shorter wavelength. In addition, it was discovered that the change in the mean wavelength of the two peaks was much greater than the change in the separation between the peaks, by a factor of approximately 5. The PM fibers used in the tests were stress rod based fibers where the cladding of the fiber was provided with a pair of longitudinal stress inducing rods which caused birefringence in the core. Tests were also performed with PM fibers with elliptical cores and cylindrical cladding that yielded identical results. Additional tests were performed using a rod based PM fiber which was manufactured without the rods to form a fiber with two air filled side holes. With this type of fiber it was discovered that the change in the mean wavelength of the peaks was much smaller than the change in the separation of the peaks, by a factor of approximately 4.5. These results for a modified Corning SH4 fiber are shown in FIG. 6 where the steep plot is the change in peak to peak separation and the shallow plot is the change in mean wavelength of the peaks. However, it was also observed that the side hole fibers did not provide two discernable spectral peaks below 3,000 psi, using the demodulation equipment available at the time the tests were made.

FIGS. 7a–7d illustrate the spectrum of light reflected by a single Bragg grating in a side hole fiber exposed to hydrostatic pressures of 8 psi, 2900 psi, 5879 psi, and 9876 psi respectively. From these Figures, it will be appreciated that at pressures less than or equal to 2900 psi. the spectral content of the reflected light does not exhibit two distinct peaks. The experiments were performed using an Ando Optical Spectrum Analyzer and a Queensgate Fabry-Perot fiber etalon demodulator. While it is possible that higher resolution demodulators might be able to detect two distinct peaks, the object of the experiments and the present invention was to find a way to enhance the resolution and dynamic range of a fiber optic pressure transducer while using readily available demodulation technology. Nevertheless, it was noted that as the pressure increases toward the point of causing detectable birefringence, the width of the single peak widens. It, therefore might also be possible to provide accurate measurements in the absence of two distinct peaks by measuring the width of the (widening or narrowing) single peak.

Figure 8:
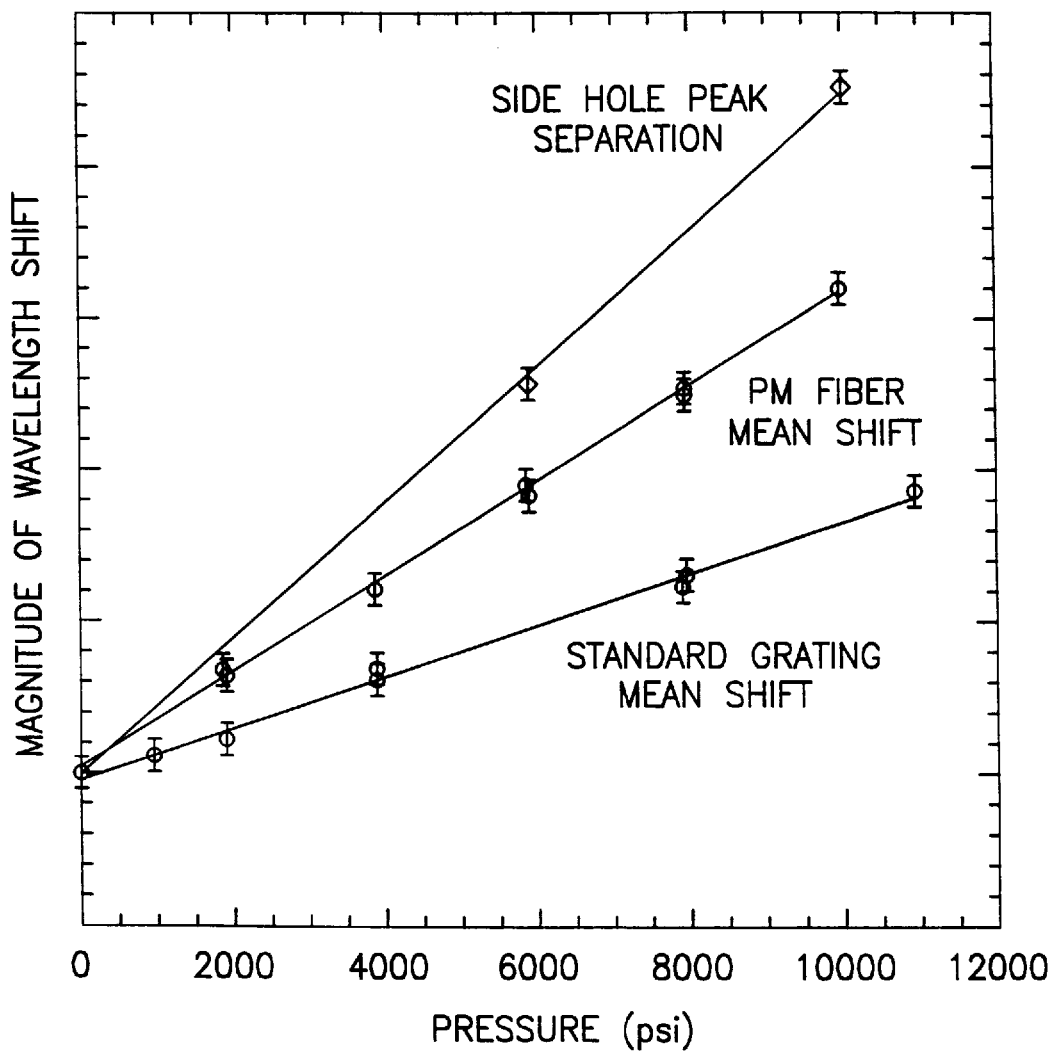
FIG. 8 is a plot showing the absolute change in wavelength of light reflected from a single Bragg grating in three different types of fiber optic.

Comparative results were obtained for the absolute magnitude of wavelength shift vs. pressure in three different types of fibers, each having a single Bragg grating of the same wavelength. FIG. 8 shows the results of experiments with a standard SMF-28 fiber, a PM type fiber, and a non-PM side hole fiber. As seen by the increasing slopes (wavelength shift in nm/psi), the PM fiber exhibited a better response (resolution or sensitivity) than a standard fiber having the same type of Bragg grating. Further, the side hole fiber exhibited a noticeably better response than the PM fiber having the same type of Bragg grating. These test results led to the conclusion that the side hole fibers offer greater resolution in the measurement of pressure and that a standard single mode fiber with a grating exhibits a better dynamic range than side hole fiber (down to zero psi), but provides only very coarse resolution of pressure because measurements must be made using a single spectral peak.

Figure 9:
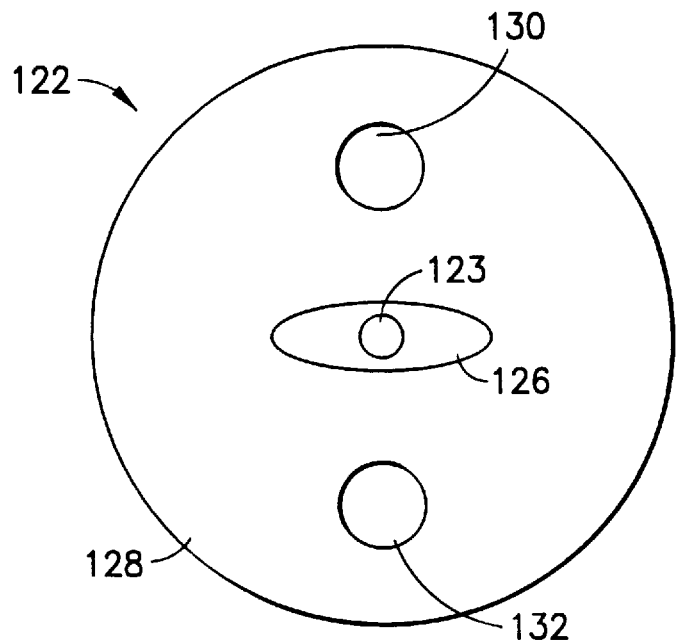
FIG. 9 is a schematic cross sectional view of a first embodiment of a fiber optic pressure transducer according to the invention.
Figure 10:
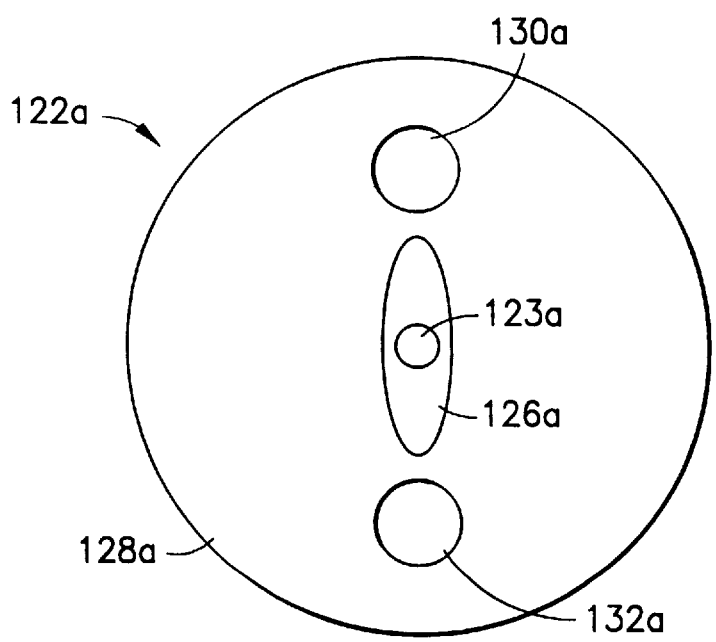
FIG. 10 is a cross sectional view of an alternate first embodiment of a fiber optic pressure transducer according to the invention.

Turning now to FIGS. 9 and 10, a first embodiment of a fiber optic pressure transducer 122 according to the invention includes a core 123 which is provided with one or more gratings (not shown). The core is surrounded by a first elliptical cladding 126 which induces birefringence. The first cladding 126 is surrounded by a second cylindrical cladding 128 which is provided with two longitudinal cylindrical side holes 130, 132 which convert isotropic pressure forces to anisotropic forces. According to the embodiment shown in FIG. 9, the core 123, first cladding 126, second cladding 128, and side holes 130, 132 are arranged with their longitudinal axes lying in a common plane and with the minor axis of the first cladding 126 lying in the common plane. An alternate first embodiment 122a, shown in FIG. 10 is substantially the same as the embodiment 122 with similar reference numerals referring to similar parts, but with the major axis of the first cladding 126a lying in the common plane. The fiber optics 122, 122a exhibit enhanced resolution and dynamic range when utilized in a pressure sensing system such as that shown in FIG. 1. In particular, the fiber optics 122, 122a are capable of providing good pressure resolution with a dynamic range of zero psi to at least 10 kpsi.

Figure 11:
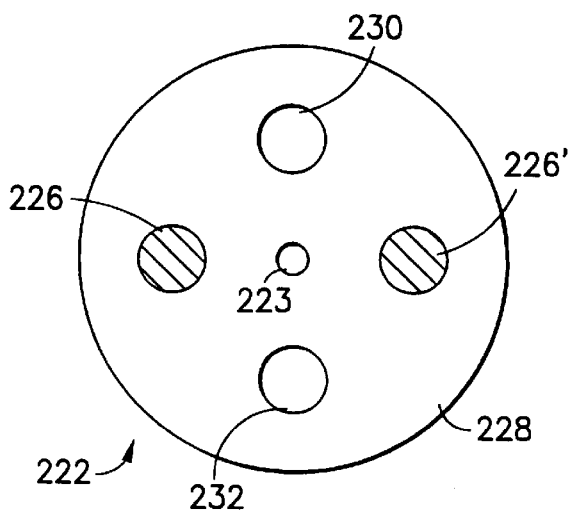
FIG. 11 is a schematic cross sectional view of a second embodiment of a fiber optic pressure transducer according to the invention.

Turning now to FIG. 11, a second embodiment of a fiber optic pressure transducer 222 according to the invention includes a core 223 which is provided with one or more gratings (not shown). The core 223 is provided with a cladding 228 which has a pair of birefringence inducing rods 226, 226' as well as a pair of longitudinal cylindrical side holes 230, 232 which convert isotropic pressure forces to anisotropic forces. As shown in FIG. 11, the core 223, the cladding 228, and the stress inducing rods 226, 226' are arranged with their longitudinal axes lying in a common first plane; and the longitudinal axes of the core 223, the cladding 228, and the longitudinal side holes 230, 232 lying in a second plane which is orthogonal to the first plane. The fiber optic pressure transducer 222 exhibits enhanced resolution and dynamic range when utilized in a pressure sensing system such as that shown in FIG. 1.

Figure 12:
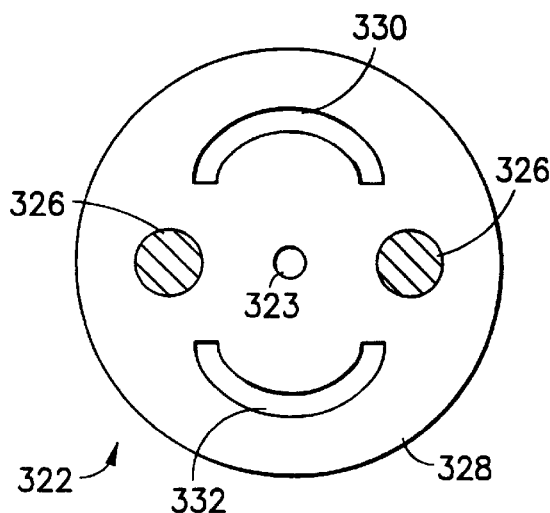
FIG. 12 is a schematic cross sectional view of a third embodiment of a fiber optic pressure transducer according to the invention.
Figure 13:
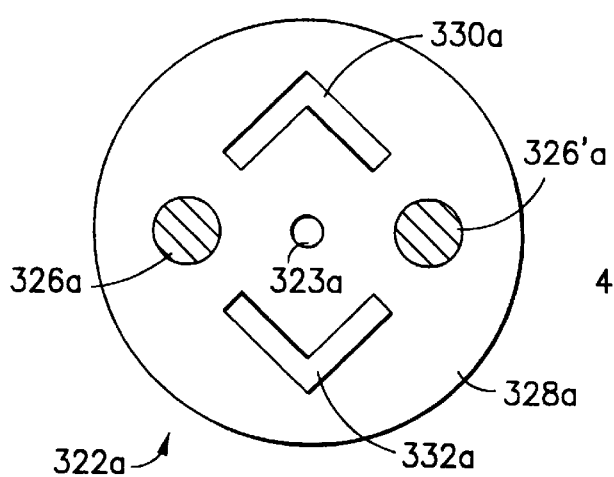
FIG. 13 is a schematic cross sectional view of an alternate third embodiment of a fiber optic pressure transducer according to the invention.

Referring now to FIG. 12, a third embodiment of a fiber optic pressure transducer 322 is similar to the embodiment 222 with similar reference numerals referring to similar parts. According to this embodiment, however, the side holes 330, 332 are not cylindrical, but have a C-shaped cross section which converts isotropic forces to anisotropic forces which are concentrated on the core 323. An alternate third embodiment 322a, shown in FIG. 13, is similar to the embodiment 322 with similar reference numerals referring to similar parts. According to this embodiment, the side holes 330a, 332a have a V-shaped cross section which converts isotropic forces to anisotropic forces which are concentrated on the core 323a. The fiber optic pressure transducers 322, 322a exhibit enhanced resolution and dynamic range when utilized in a pressure sensing system such as that shown in FIG. 1.

Figure 14:
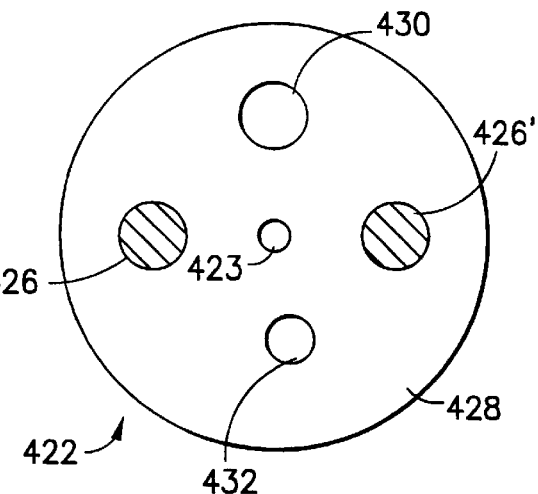
FIG. 14 is a schematic cross sectional view of a fourth embodiment of a fiber optic pressure transducer according to the invention.

FIG. 14 shows a fourth embodiment of a fiber optic pressure transducer 422 is similar to the second embodiment 222 with similar reference numerals referring to similar parts. According to this embodiment, however, the side holes 430, 432 are asymmetrical in size and location. In particular, the side hole 432 has a smaller cross sectional diameter than the side hole 430. In addition, the longitudinal axis of the side hole 432 does not lie in a common plane with the side hole 430 and the core 423. The fiber optic pressure transducer 422 exhibits enhanced resolution and dynamic range when utilized in a pressure sensing system such as that shown in FIG. 1.

Figure 15:
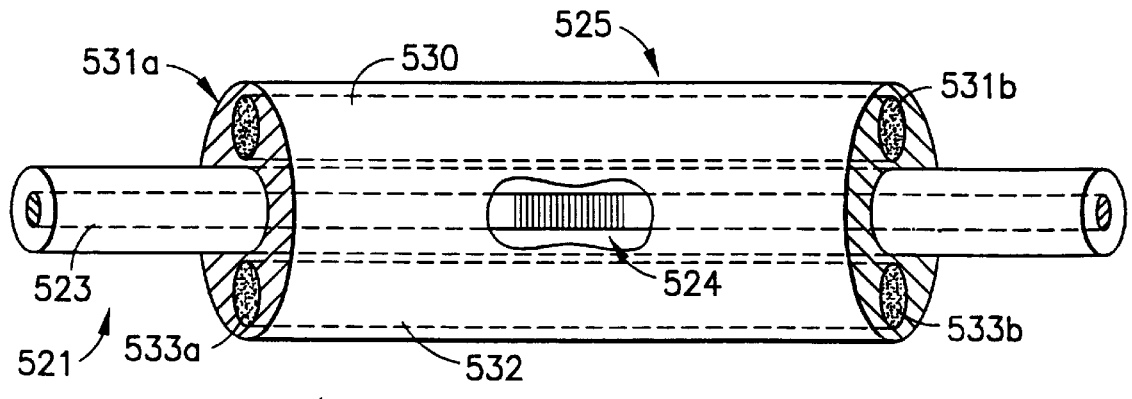
FIG. 15 is a schematic view of a fifth embodiment of a fiber optic pressure transducer according to the invention.

Turning now to FIG. 15, a fifth embodiment of a fiber optic pressure transducer 522 according to the invention includes a PM fiber optic 521 having a core 523 which is provided with one or more gratings 524 and a pair of stress inducing rods (not shown). The PM fiber optic 521 is inserted in a capillary tube 525 which is provided with two longitudinal cylindrical side holes 530, 532 which convert isotropic pressure forces to anisotropic forces. The ends of the side holes are plugged with epoxy 531a, 531b, 533a, 533b or sealed in any other suitable manner. The fiber optic pressure transducer 522 exhibits enhanced resolution and dynamic range when utilized in a pressure sensing system such as that shown in FIG. 1.

Figure 16:
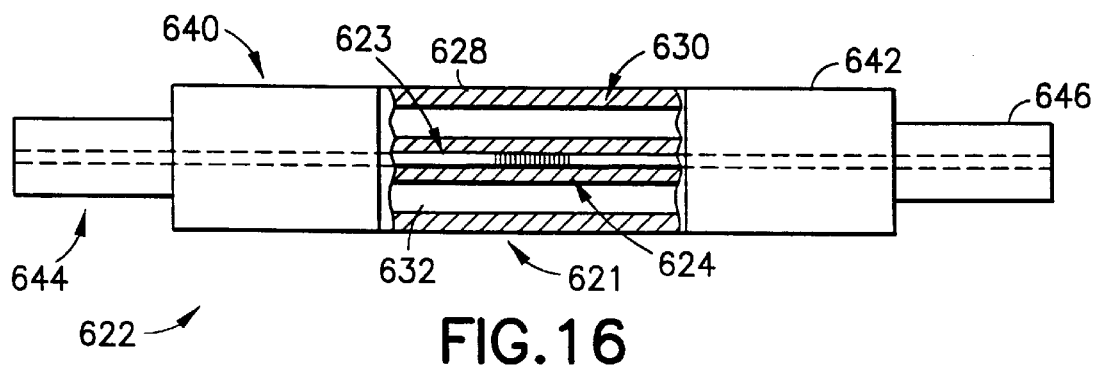
FIG. 16 is a schematic view of a sixth embodiment of a fiber optic pressure transducer according to the invention.

A sixth embodiment of a fiber optic pressure transducer 622 is shown in FIG. 16. According to this embodiment, a PM fiber 621 having a core 623 inscribed with one or more gratings 624 is provided with an oversized cladding 628 which has oversized side holes 630, 632. The side holes are sealed by splicing the fiber 621 to two pieces of single mode fiber 640, 642 which have the same oversized diameter. The ends of the single mode fibers are then spliced to telecommunications grade fiber 644, 646. The fiber optic pressure transducer 622 exhibits enhanced resolution and dynamic range when utilized in a pressure sensing system such as that shown in FIG. 1.

Figure 17:
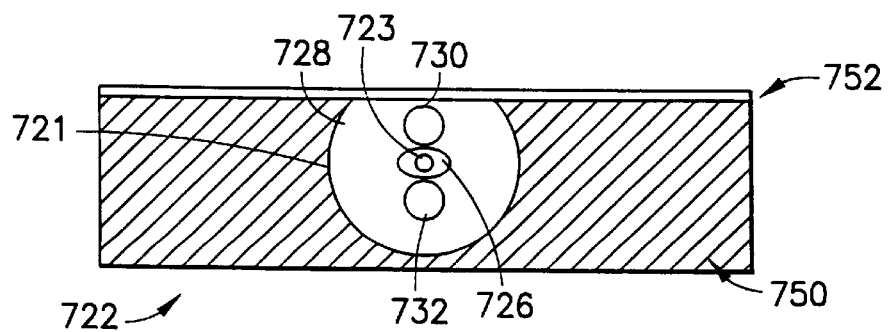
FIG. 17 is a schematic cross sectional view of a seventh embodiment of a fiber optic pressure transducer according to the invention.

Turning now to FIG. 17, a seventh embodiment of a fiber optic pressure transducer 722 includes a PM fiber 721 having a core 723 with one or more gratings (not shown), a first elliptical cladding 726 surrounding the core, and a second cladding 728 surrounding the first cladding. The second cladding is provided with asymmetrical side holes 730, 732 and is mounted in a stiff backing material 750 with a portion of its surface exposed. A flexible diaphragm 752 is attached to the backing material 750 and covers the exposed portion of the cladding 728. Pressure applied to the diaphragm 752 is converted to transverse strain in the core 723. The fiber optic pressure transducer 722 exhibits enhanced resolution and dynamic range when utilized in a pressure sensing system such as that shown in FIG. 1.

Figure 18:
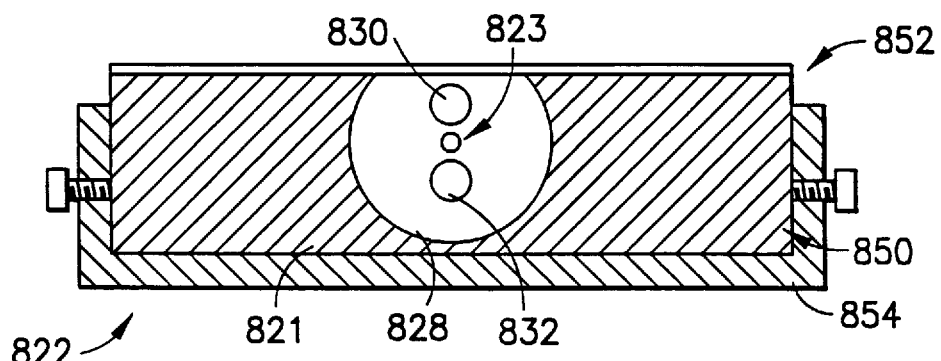
FIG. 18 is a schematic cross sectional view of an eighth embodiment of a fiber optic pressure transducer according to the invention.

FIG. 18 shows an eighth embodiment of a fiber optic pressure transducer 822 includes a single mode fiber 821 having a core 823 with one or more gratings (not shown) and a cladding 828 with a pair of side holes 830, 832. The cladding 828 is mounted in a stiff backing material 850 with a portion of its surface exposed. A flexible diaphragm 852 is attached to the backing material 850 and covers the exposed portion of the cladding 828. The backing material 850 is mounted in a mechanical assembly 854 (such as a clamp or a vise) which induces stress in the backing material 850, the cladding 828, and the core 823 to induce birefringence in the core. Pressure applied to the diaphragm 852 is converted to transverse strain in the core 823. The fiber optic pressure transducer 822 exhibits enhanced resolution and dynamic range when utilized in a pressure sensing system such as that shown in FIG. 1.

Figure 19:
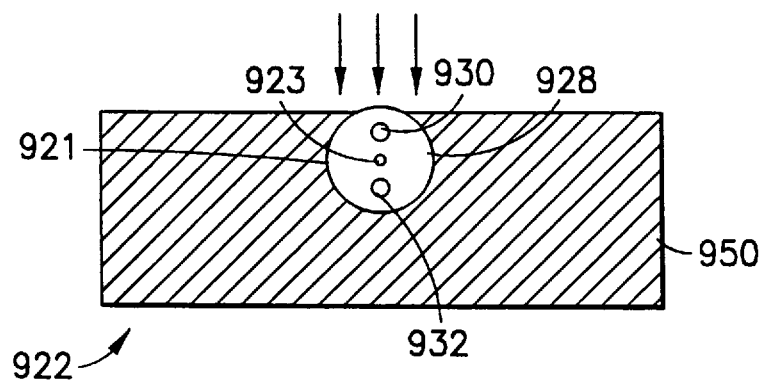
FIG. 19 is a schematic cross sectional view of a ninth embodiment of a fiber optic pressure transducer according to the invention.

Turning now to FIG. 19, a ninth embodiment of a fiber optic pressure transducer 922 includes a single mode fiber 921 having a core 923 with one or more gratings (not shown) and a cladding 928 with a pair of side holes 930, 932. The cladding 928 is rolled into a piece of glass 950 having a low melting temperature relative to the cladding, leaving a portion of the surface of the cladding exposed. The glass acts as a strain inducing member which induces birefringence in the core 923. Pressure applied to the exposed surface of the cladding is converted to transverse strain in the core 923. A diaphragm (not shown) may be attached to the glass covering the exposed surface of the cladding. The fiber optic pressure transducer 922 exhibits enhanced resolution and dynamic range when utilized in a pressure sensing system such as that shown in FIG. 1.

Figure 20:
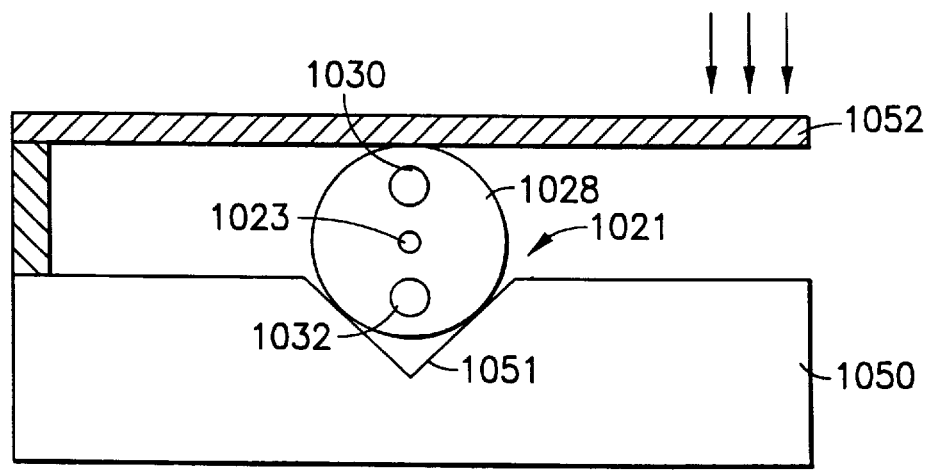
FIG. 20 is a schematic cross sectional view of a tenth embodiment of a fiber optic pressure transducer according to the invention.

FIG. 20 shows a tenth embodiment of a fiber optic pressure transducer 1022 which includes a single mode fiber 1021 having a core 1023 with one or more gratings (not shown) and a cladding 1028 with a pair of side holes 1030, 1032. The cladding 1028 is supported on a stiff backing material 1050 such as a plate with a V-shaped groove 1051 and a lever arm 1052 is mounted above the cladding 1028. Pressure applied to the free end of the lever arm 1052 is converted into transverse strain in the core 1023. The fiber optic pressure transducer 1022 exhibits enhanced resolution and dynamic range when utilized in a pressure sensing system such as that shown in FIG. 1.

Figure 21:
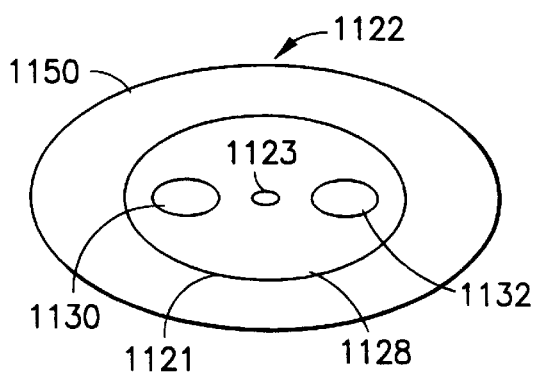
FIG. 21 is a schematic cross sectional view of an eleventh embodiment of a fiber optic pressure transducer according to the invention.
Figure 22:
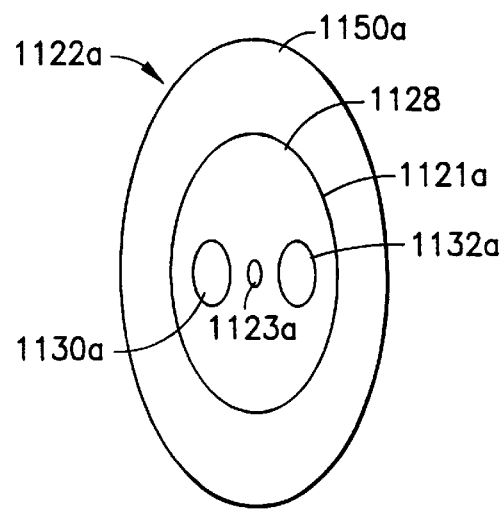
FIG. 22 is a schematic cross sectional view of an alternate eleventh embodiment of a fiber optic pressure transducer according to the invention.

Turning now to FIG. 21, an eleventh embodiment of a fiber optic pressure transducer 1122 includes a single mode fiber 1121 having a core 1123 with one or more gratings (not shown) and a cladding 1128 with a pair of side holes 1130, 1132. The cladding 1128 is inserted into a capillary sleeve of glass 1150 having a low melting temperature relative to the cladding. The glass 1150 is heated and rolled to form an elliptical outer glass jacket. The glass jacket acts as a strain inducing member which induces birefringence in the core 1123 which assumes an elliptical cross section. The side holes 1130, 1132 also assume an elliptical cross section after the glass jacket is heated and rolled. Pressure applied to the jacket 1150 converted into transverse strain in the core 1123. As shown in FIG. 21, the jacket 1150 is formed such that the major axis of its elliptical cross section lies in a common plane which includes the longitudinal axes of the core 1123 and the side holes 1130, 1132. An alternative eleventh embodiment 1122a is shown in FIG. 22 where similar reference numerals refer to similar parts. As shown in FIG. 22, the jacket 1150a is formed such that the minor axis of its elliptical cross section lies in a common plane which includes the longitudinal axes of the core 1123a and the side holes 1130a, 1132a. The fiber optic pressure transducers 1122, 1122a exhibit enhanced resolution and dynamic range when utilized in a pressure sensing system such as that shown in FIG. 1.

Figure 23:
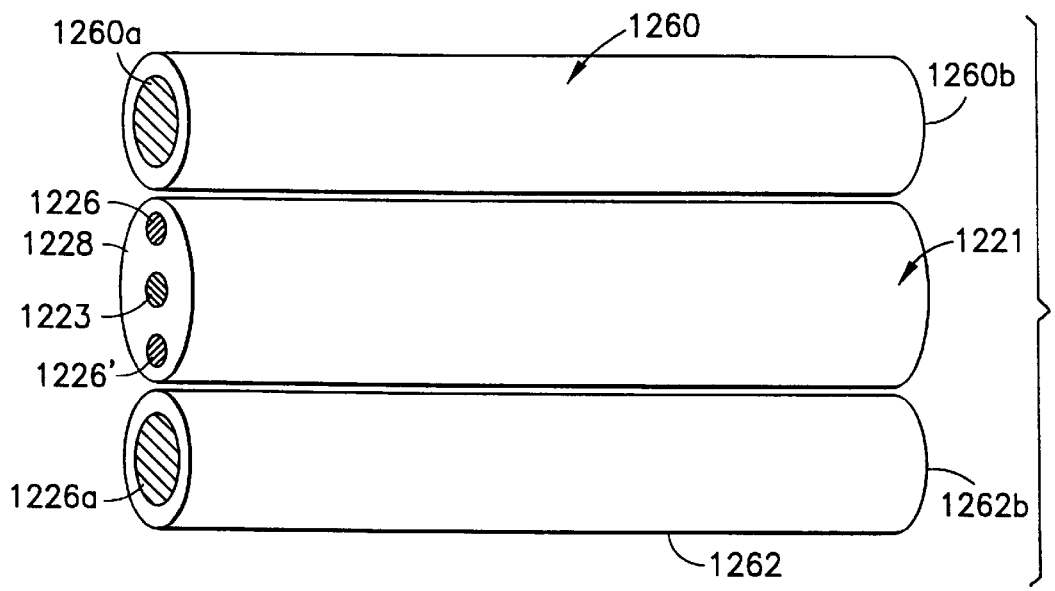
FIG. 23 is a schematic view of an twelfth embodiment of a fiber optic pressure transducer according to the invention.

FIG. 23 shows a twelfth embodiment of a fiber optic pressure transducer 1222 which includes a PM fiber 1221 having a core 1223 with one or more gratings (not shown) and a cladding 1228 with a pair of longitudinal stress inducing rods 1226, 1226'. A pair of capillary tubes 1260, 1262, each having end caps 1260a, 1260b, 1262a, 1262b, are bonded to the sides of the cladding 1228. The fiber optic pressure transducer 1222 exhibits enhanced resolution and dynamic range when utilized in a pressure sensing system such as that shown in FIG. 1.

Figure 24:
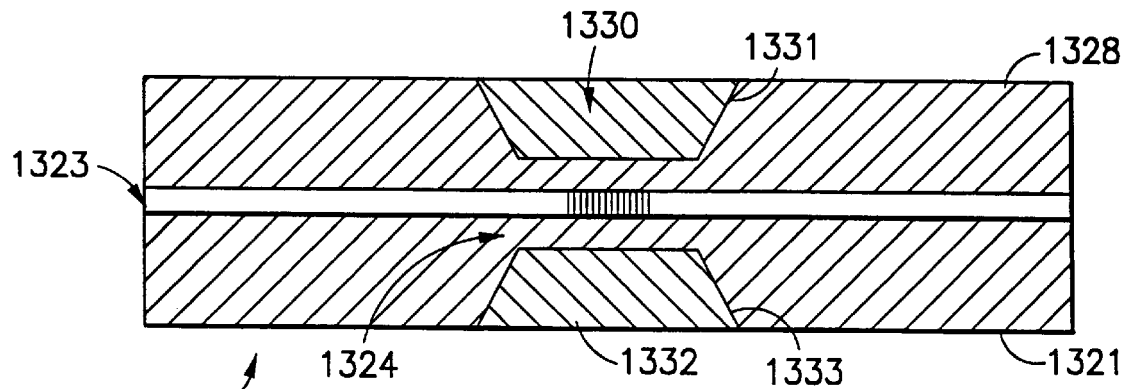
FIG. 24 is a schematic longitudinal sectional view of a thirteenth embodiment of a fiber optic pressure transducer according to the invention.
Figure 25:
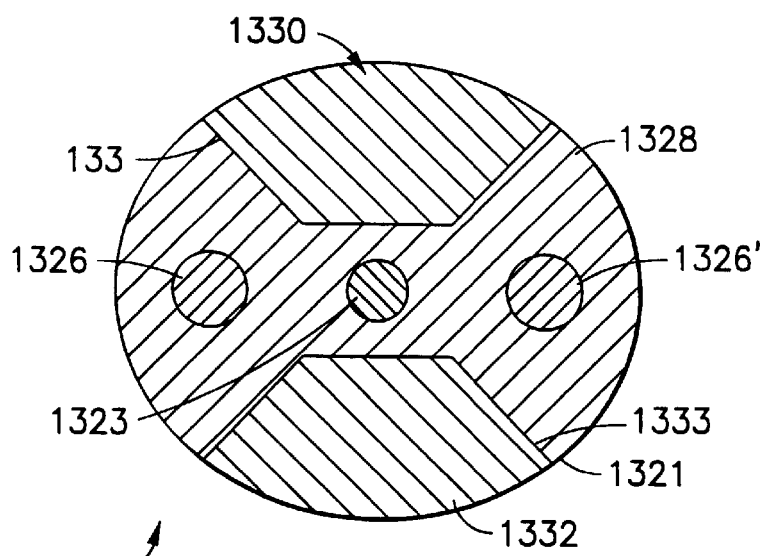
FIG. 25 is a schematic cross sectional view of the thirteenth embodiment of a fiber optic pressure transducer according to the invention.

Turning now to FIGS. 24 and 25, a thirteenth embodiment of a fiber optic pressure transducer 1322 includes a PM fiber 1321 having a core 1323 with one or more gratings 1324 and a cladding 1328 with a pair of longitudinal stress inducing rods 1326, 1326'. Two portions 1331, 1333 of the cladding 1328 are milled or etched and filled with pressure sensitive material 1330, 1332, i.e. material more sensitive to pressure than the cladding such as nylon. Pressure applied to the material 1330, 1332 is converted into transverse strain on the core 1323. The fiber optic pressure transducer 1322 exhibits enhanced resolution and dynamic range when utilized in a pressure sensing system such as that shown in FIG. 1.

There have been described and illustrated herein several embodiments of a fiber optic pressure transducer having enhanced resolution and dynamic range and a fiber optic pressure sensing system utilizing the same. While particular embodiments of the invention have been described, it is not intended that the invention be limited thereto, as it is intended that the invention be as broad in scope as the art will allow and that the specification be read likewise. For example, the pressure sensing system disclosed is merely exemplary of a system in which the fiber optic pressure transducer may be used. Those skilled in the art will appreciate that the fiber optic pressure transducer of the invention may be advantageously used in other types of pressure sensing systems. In addition, it will be understood that multiple gratings may be used in a single optical wave guide to provide pressure measurement from different locations via a single wave guide. Those skilled in the art will further understand that small fiber optic pressure transducers according to the invention can be spliced to communications grade fiber optics and located at a detection point relatively distant from the spectral analyzer(s). It will therefore be appreciated by those skilled in the art that yet other modifications could be made to the provided invention without deviating from its spirit and scope as so claimed.

We claim:

1. A fiber optic transducer, comprising:
   a) a fiber optic core having at least one grating formed along at least one portion thereof;
   b) a first cladding surrounding said core;
   c) birefringence means for enhancing birefringence in said core; and
   d) pressure responsive means for converting isotropic pressure forces to anisotropic forces on said core.

2. A fiber optic transducer according to claim 1, wherein:
said birefringence means includes a second elliptical cladding between said core and said first cladding, and
said pressure responsive means includes a pair of longitudinal holes in said first cladding.

3. A fiber optic transducer according to claim 2, wherein:
said longitudinal holes are arranged such that their longitudinal axes lie in the same plane as the longitudinal axis of the core.

4. A fiber optic transducer according to claim 3, wherein:
said elliptical cladding has its major axis lying in the same plane as the axes of said holes and said core.

5. A fiber optic transducer according to claim 3, wherein:
said elliptical cladding has its minor axis lying in the same plane as the axes of said holes and said core.

6. A fiber optic transducer according to claim 1, wherein:
said birefringence means includes a pair of longitudinal rods embedded in said first cladding, and
said pressure responsive means includes a pair of longitudinal holes in said first cladding.

7. A fiber optic transducer according to claim 6, wherein:
said holes are arranged such that their longitudinal axes lie in a first plane which also includes the longitudinal axis of said core,
said rods are arranged such that their longitudinal axes lie in a second plane which also includes the longitudinal axis of said core, and
said second plane and said first plane intersect each other at an angle.

8. A fiber optic transducer according to claim 6, wherein:
said longitudinal holes have a V-shaped cross section.

9. A fiber optic transducer according to claim 6, wherein:
said longitudinal holes have a C-shaped cross section.

10. A fiber optic transducer according to claim 6, wherein:
said longitudinal holes have different diameters.

11. A fiber optic transducer according to claim 6, wherein:
said holes are arranged such that their longitudinal axes lie in a first plane which does not include the longitudinal axis of said core.

12. A fiber optic transducer according to claim 1, wherein:
said birefringence means includes a second elliptical cladding between said core and said first cladding, and
said pressure responsive means includes a capillary tube surrounding said first cladding, said capillary tube having a pair of longitudinal holes substantially parallel to said cladding.

13. A fiber optic transducer according to claim 12, wherein:
ends of said holed are sealed.

14. A fiber optic transducer according to claim 2, further comprising:
   e) a rigid backing member; and
   f) a flexible diaphragm, wherein
said first cladding is arranged between said flexible diaphragm and said rigid backing member.

15. A fiber optic transducer according to claim 1, wherein:
said birefringence means includes a mechanical structure arranged to exert force on said first cladding, and
said pressure responsive means includes a pair of longitudinal holes in said first cladding.

16. A fiber optic transducer according to claim 1, wherein:
said birefringence means includes a soft glass member arranged to exert force on said first cladding, and
said pressure responsive means includes a pair of longitudinal holes in said first cladding.

17. A fiber optic transducer according to claim 15, wherein:
said mechanical structure includes a clamping member.

18. A fiber optic transducer according to claim 15, wherein:
said mechanical structure includes a rigid base and a lever arm, said first cladding being located between said base and said lever arm.

19. A fiber optic transducer according to claim 1, wherein:
said birefringence means includes an elliptical glass tube surrounding said first cladding, and
said pressure responsive means includes a pair of longitudinal holes in said first cladding.

20. A fiber optic transducer according to claim 19, wherein:
the longitudinal axes of said holes and said core lie in a first plane which includes the major axis of said elliptical glass tube.

21. A fiber optic transducer according to claim 19, wherein:
the longitudinal axes of said holes and said core lie in a first plane which includes the minor axis of said elliptical glass tube.

22. A fiber optic transducer according to claim 1, wherein:
said birefringence means includes a pair of longitudinal rods embedded in said first cladding, and
said pressure responsive means includes a pair of capillary tubes bonded to said first cladding.

23. A fiber optic transducer according to claim 1, wherein:

said birefringence means includes a pair of longitudinal rods embedded in said first cladding, and said pressure responsive means includes a pressure sensitive material filled in to an etched or milled portion of said first cladding.

24. A fiber optic sensing system for measuring pressure or transverse strain, comprising:
   a) a light source;
   b) a spectral analyzer; and
   c) a fiber optic transducer including
      i) a fiber optic core having al least one grating formed along at least one portion thereof,
      ii) a first cladding surrounding said core,
      iii) birefringence means for enhancing birefringence in said core, and
      iv) pressure responsive means for converting isotropic pressure forces to anisotropic forces on said core, wherein
      said light source is arranged to direct light into said core and said spectral analyzer is arranged to detect light exiting said core.

25. A fiber optic sensing system according to claim 24, further comprising:
   d) a beam splitter; and
   e) a low back reflection terminator, wherein
      said core has a first end and a second end,
      said beam splitter is located between said light source and said first end of said core,
      said low back reflection terminator is located at said second end of said core, and
      said spectral analyzer is located relative to said beam splitter such that light from said light source enters said first end of said core, and at least a portion of said light is reflected by said at least one grating back out of said first end of said core through said beam splitter to said spectral analyzer.

26. A method of measuring pressure or transverse strain, comprising:
   a) optically coupling a fiber optic grating transducer to a light source;
   b) directing light from the light source into the core of the fiber optic grating transducer;
   c) optically coupling a spectral analyzer to the fiber optic grating transducer; and
   d) measuring the width of one or more spectral peaks detected by the spectral analyzer to determine the pressure or transverse strain ambient to the fiber optic grating transducer.

27. A method of measuring pressure or transverse strain, comprising:
   a) obtaining a fiber optic grating transducer having birefringence means for enhancing birefringence in the core and pressure responsive means for converting isotropic pressure forces to anisotropic forces on the core;
   b) optically coupling the fiber optic grating transducer to a light source;
   c) directing light from the light source into the core of the fiber optic grating transducer;
   d) optically coupling a spectral analyzer to the fiber optic grating transducer; and
   e) measuring the separation of two spectral peaks detected by the spectral analyzer to determine the pressure or transverse strain ambient to the fiber optic grating transducer.

* * * * *